United States Patent [19]

Austruy et al.

[11] Patent Number: 5,272,584
[45] Date of Patent: Dec. 21, 1993

[54] HOT-PLUGGING CIRCUIT FOR THE INTERCONNECTION OF CARDS TO BOARDS

[75] Inventors: Pierre Austruy, Nice; Jean-Paul Conjeaud, Antibes; Patrick Massi, St. Laurent du Var; Christian Jacquart, Gattieres, all of France

[73] Assignee: International Business Machines Corporation, Armonk, N.Y.

[21] Appl. No.: 792,329

[22] Filed: Nov. 12, 1991

[30] Foreign Application Priority Data

Dec. 7, 1990 [EP] European Pat. Off. ........ 90480206.3

[51] Int. Cl.⁵ .............................................. H02H 9/00
[52] U.S. Cl. .................................. 361/58; 361/111; 323/908
[58] Field of Search ............... 361/56, 91, 111, 58; 323/908

[56] References Cited

U.S. PATENT DOCUMENTS 4,245,270  1/1981  Busby ................................ 361/58
5,077,675 12/1991  Tam .................................. 361/58

FOREIGN PATENT DOCUMENTS 0356186  8/1988  European Pat. Off. .
0388753  9/1990  European Pat. Off. .
2056198  3/1981  United Kingdom .
2218549 11/1989  United Kingdom .

OTHER PUBLICATIONS

IBM Technical Disclosure Bulletin, vol. 32, No. 2, Jul. 1989, pp. 318-320.

Primary Examiner—Todd DeBoer
Attorney, Agent, or Firm—Joscelyn G. Cockburn

[57] ABSTRACT

A hot plug circuit insuring that the plugging of cards to a board is performed in the hot-plug mode when the cards are supplied from a common power supply located on one of the cards or on the board. This circuit (62) limits the surge current generated at the interconnection of first circuits (30) arranged on a first card (1) and powered by a supply device (2) providing a first supply voltage (ground) on a first supply line (36) and a second supply voltage (+V) on a second supply line (34), with second circuit (24) on a second card powered by the supply device (2) through a third supply line (74) and fourth supply line (76). The surge current results from the charge of a decoupling capacitor of capacitance Cd arranged on the second card between the third and fourth supply lines when the cards are interconnected through an interconnecting arrangement (14, 12, 22). The hot plug circuit comprises a controlled ramp generation device connected to the first and second supply lines and activated when the connection between the first and third supply line is completed through the connecting arrangement to start the generation on the fourth supply line of a first ramp voltage Vb derived from the voltages on the first and second supply lines, said ramp voltage having an adjustable slope a=dVb/dt, whereby the surge current i which is equal to a.Cd can be limited to a desired value by adjusting the slope value a.

9 Claims, 6 Drawing Sheets

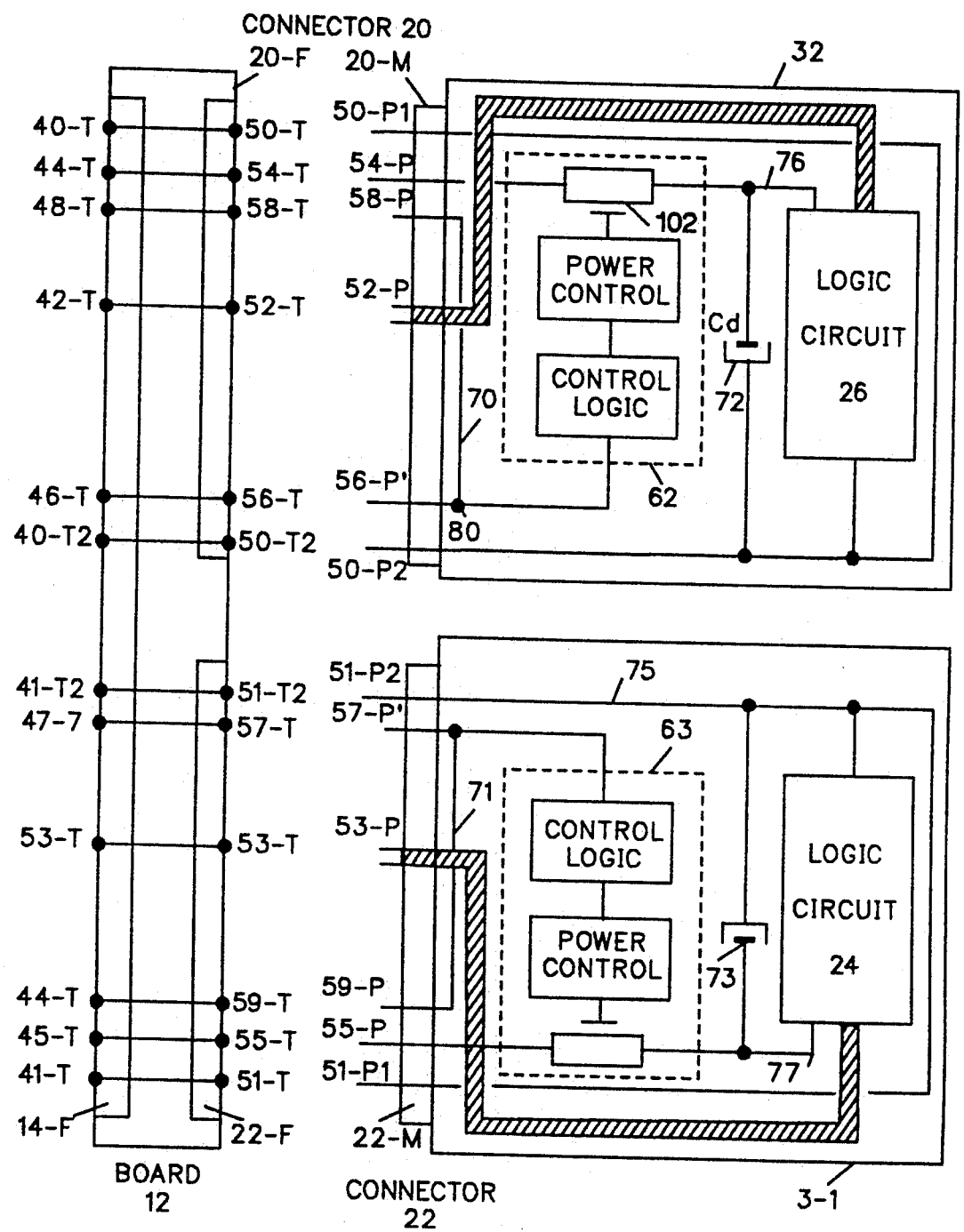

HOT-PLUGGING CIRCUIT FOR THE INTERCONNECTION OF CARDS TO BOARDS

DESCRIPTION OF THE INVENTION

The present invention relates to the interconnection of cards to boards and more particularly to a circuit which insures that the plugging of cards to a board is performed in the hot-plug mode when the cards are supplied from a common power supply located on one of the cards or on the board.

BACKGROUND ART

The plugging and unplugging of cards to/from a board raise problems when the cards are not provided with their own power supply but are powered from a common power supply, because a surge current is generated when a card is plugged which disturbs the operation of the circuits located on the already plugged cards.

It is well known to use connectors having different pin lengths to provide for the correct sequencing of the applications of the different voltage levels which are required by the circuits arranged on the cards, when the cards are plugged.

Such arrangements are described in U.S. Pat. No. 3,993,935 and in the article published in the IBM Technical Disclosure Bulletin Volume 31 No. 6- Nov. 6, 1988 page 125.

FIG. 1 shows how the problem of the surge current generated when a card is plugged is solved in a conventional way.

FIG. 1 shows a card 1 called master card because it comprises a power supply device 2 able to provide the supply voltages to cards such as 3 pluggable to card 1 through a connecting arrangement 4 comprising a board and connectors for example. The power supply 2 provides a first voltage at terminal 5 of the connecting arrangement 4 and a second voltage at two terminals 6-1 and 6-2, it will be assumed that the first voltage is the ground voltage and the second voltage is a positive supply voltage +V.

For the sake of simplicity, only one supply voltage +V is shown in FIG. 1, but depending upon the operation of the circuits arranged on the cards several different supply voltages may be required.

The card 3 can be connected to the connecting arrangement 4 by means of male connector 7 which comprises a ground pin 8 and two voltage pins 9-1 and 9-2 which can be plugged to terminals 5, 6-1 and 6-2 respectively. The pin 9-1 is longer than the pin 9-2. When the connector 7 is plugged to connecting arrangement 4, the ground voltage and V voltage are applied for biasing the circuit arranged on card 3 through pin 8 and pin 9-2 and lines 10 and 11. A decoupling capacitor Cd is arranged between the lines 10 and 11 providing the ground and V voltage to the circuit on card 3.

To solve the problem raised by the surge current Is due to the charge of the decoupling capacitor Cd when the card is plugged, a resistor R of resistance r limits the surge current Is to an acceptable value.

The resistance r depends upon the voltage V and upon the value of the surge current which is tolerated. The time constant $\tau$ of the charge of the capacitor Cd must be low with respect to the time difference between the application of voltage V to long pin 9-1 and the application of voltage V to short pin 9-2, which is a specification of the connector. When the capacitance of capacitor Cd is low, a resistance r can be found which meets the above constraints. But when the capacitance Cd is high the problem is unsolvable.

SUMMARY OF THE INVENTION

An object of the present invention is a circuit which allows the plugging and unplugging of cards into or from a board to be performed in an efficient way without perturbing the operation of the cards already plugged to the board.

Another object of the invention is to provide such a circuit which allows the concurrent maintenance of the system incorporating the cards to be achieved.

The hot plug circuit according to the present invention is used for limiting the surge current generated at the interconnection of first circuit means arranged on a first card and powered by a supply device providing a first supply voltage (ground) on a first supply line and a second supply voltage (+V) on a second supply line, with second circuit means on a second card powered by the supply device through a third supply line and a fourth supply line, where said surge current results from the charge of a decoupling capacitor of capacitance Cd arranged on the second card between the third and fourth supply lines when the cards are interconnected through an interconnecting arrangement.

This circuit is characterized in that it comprises controlled ramp generation means connected to the first and second supply lines, which are activated when the connection between the first and third supply lines is completed through the connecting arrangement to start the generation on the fourth supply line of a first ramp voltage Vb derived from the voltages on the first and second supply lines, said ramp voltage having an adjustable slope $a = dVb/dt$, whereby the surge current i which is equal to $a \cdot Cd$ can be limited to a desired value by adjusting the slope value a.

In a preferred embodiment of the invention, the interconnecting arrangement comprises a first connector having first and second supply pins connected to the first supply line, with said first pin being longer than said second pin, the first pin being connectable to the third supply line to supply the first voltage to the second circuit means before the cards are completely interconnected and the second card comprises a presence indication line connectable to the second supply pin when the interconnection of the first and second cards is completed, which generates on said presence indication line a first control signal derived from the first supply voltage which is provided to the controlled ramp generation control means to start the generation of the first ramp voltage.

In addition, the first and second supply pins of the first connector are located at a first end of said connector and the connector comprises a third supply pin located a its second end. The interconnecting arrangement comprises a second connector located on the second card, said second connector comprising fourth, fifth and sixth pins connectable to the first, second and third pins respectively when the first and second cards are interconnected through the interconnecting arrangement, the presence indication line being connected on the second card between the fifth and sixth pins, whereby the first control signal is provided from the presence indication line to the controlled ramp generation means when the third and sixth pins are connected which prevents the plugging of the cards in a skewed manner from disturbing the operation of the first and second circuit means.

DETAILED DESCRIPTION OF THE INVENTION

The present invention relates to the interconnection of the circuit assemblies arranged on different cards in order the circuit assemblies operate and may be able to exchange signals or data. More particularly, the invention relates to a circuit which allows the interconnection to be made in hot-plug mode when a power supply device is mounted on one of the cards which will be called the master card hereafter and provides the supply voltages and currents to the circuit assembly mounted on the master card if any and also to the circuit assemblies mounted on cards (called slave cards hereafter) which can be plugged and unplugged to the master card through a connecting arrangement.

The connecting arrangement comprises connectors and busses comprising power lines for providing the supply voltages from the power supply device and data or signal transfer lines.

A hot plug circuit according to the present invention is associated to each card and located either on the master card or the slave cards depending upon the specific implementation of the invention in order to prevent the plugging and unplugging of a slave card from disturbing the operation of the circuit assemblies on the master card and on the already plugged slave cards whatever the value of the decoupling capacitor be.

Figure 1:
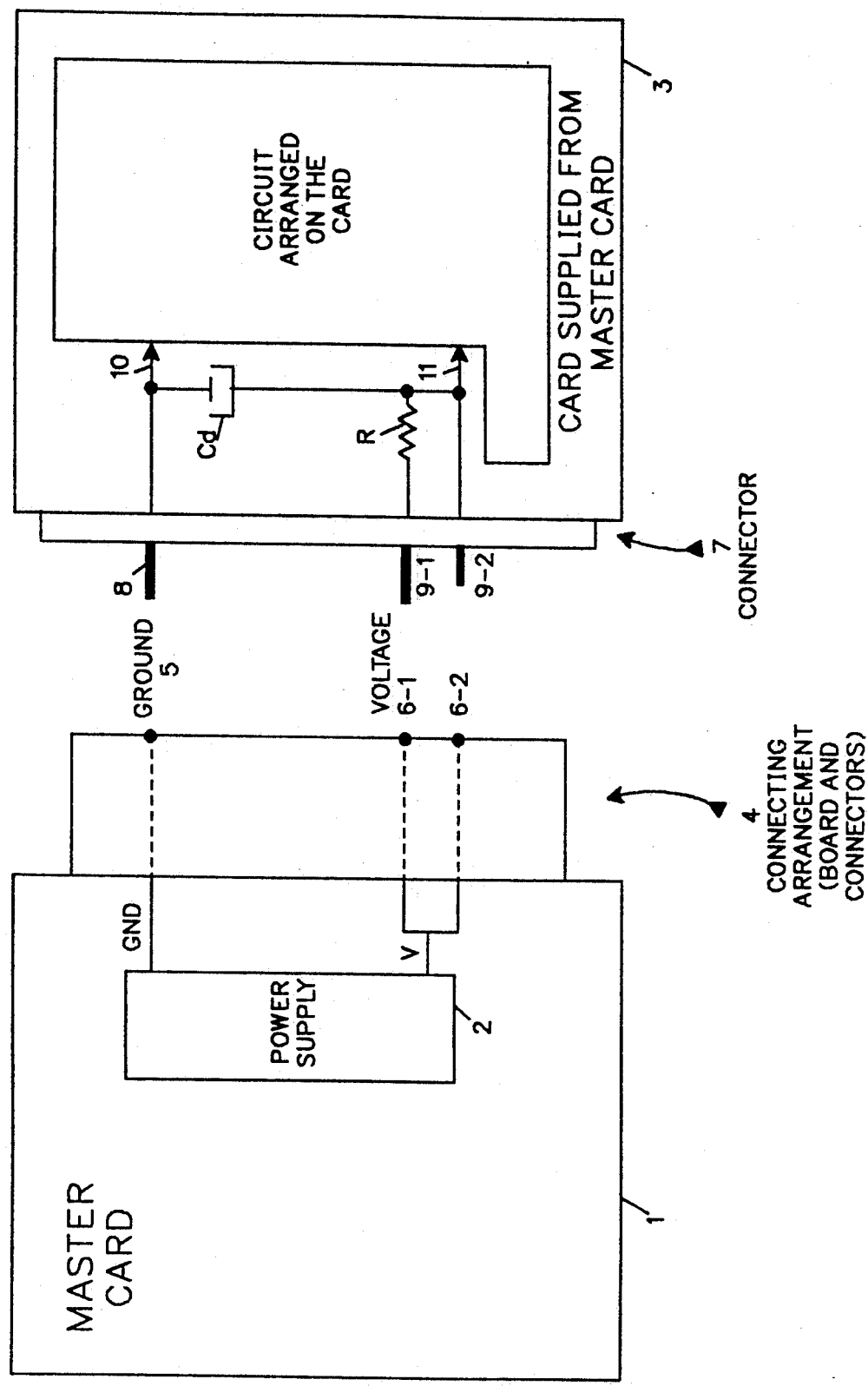
FIG. 1 is a schematic showing prior art solution.
Figure 2A:
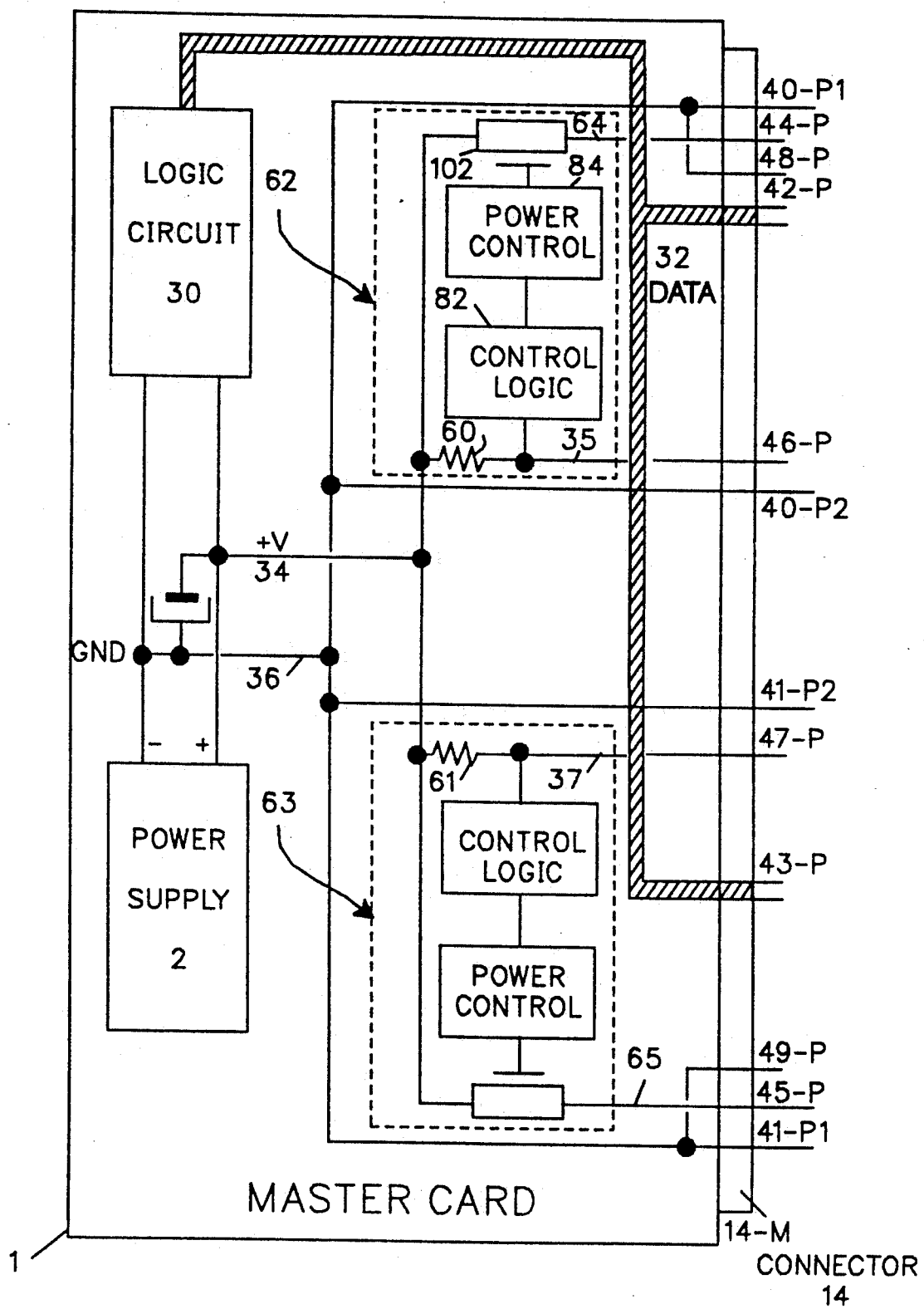
FIG. 2 is a hot plug circuit arrangement according to the teachings of the present invention.
Figure 2B:
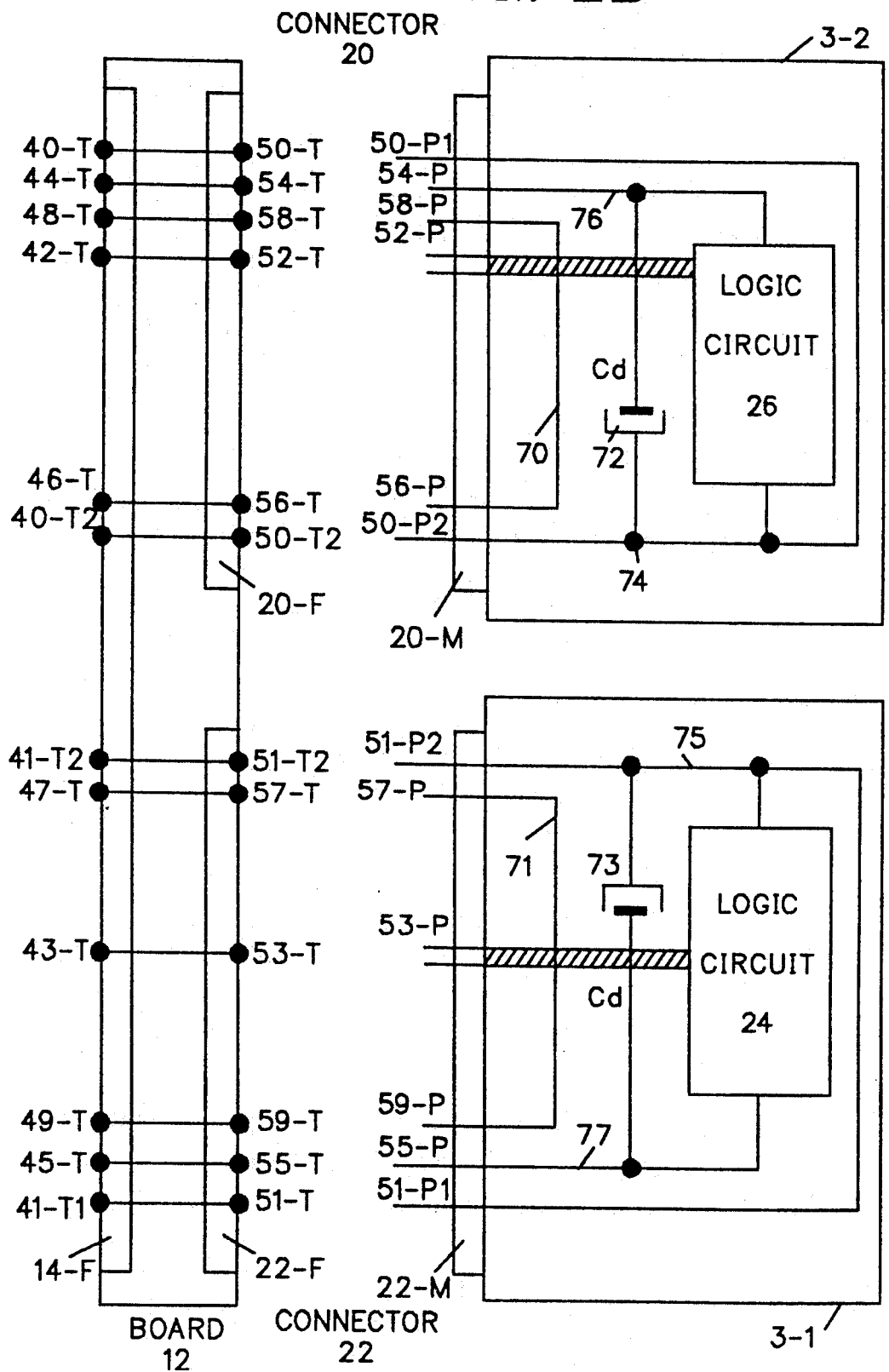

FIG. 1 represents how the problem is solved in the prior art as described in the background part of the description and FIG. 2 represents a first embodiment of the hot plug circuit according to the present invention. Identical reference numbers are used in FIGS. 1 and 2 to represent identical elements.

The master card 1 is plugged to a board 12 through an edge connector 14 comprising a male part 14-M on the master card and a female part 14-F on the board 12. The power supply device 2 is arranged on the master card 1.

Slave cards such as 3-1 and 3-2 can be plugged to the board 12 through connectors 20 and 22 on the other side of the board, these connectors comprising female parts 20-F and 22-F on the board 12 and male parts 20-M and 22-M on the cards.

Obviously, the arrangement of the male and female parts of the connectors with respect to the cards and board can be the reverse of the represented one.

Circuit assemblies 24 and 26 on the slave cards 3-1 and 3-2, which can be of any type for example logic circuit assemblies, are powered from the power supply device 2 on the master card 1. As is schematically shown in FIG. 2, a logic circuit assembly 30 is also arranged on master card 1 and is powered by the power supply device 2 and is interconnected with logic circuit assemblies 24 and 26 when the cards are plugged by means of connectors 20 and 22 through bus 32 carrying data or any type of signals depending the application of the invention. For the sake of clarity, it will be assumed that circuit assemblies 24, 26 and 30 are supplied with only one voltage V provided by power supply circuit 2 on line 34 and the ground voltage provided on line 36.

The male part of connector 14 is provided with two sets of pins in relationship with corresponding pins of the male parts 20-M and 22-M of connectors 20 and 22.

The first set of pins of the male part of connector 14 are referenced by even numbers 40 to 48 followed by the suffix P (with P meaning Pin) and the second set of pins are referenced by odd numbers 41 to 49 also followed by the suffix P.

The female part of connector 14 comprises corresponding terminals referenced by the same numbers followed by the suffix T, with T meaning Terminals.

The terminals of the female part 20-F of connector 20 have even reference numbers 50-T to 58-T, terminals 50-T to 58-T are connected to terminals 40-T to 48-T respectively.

The terminals of the female part 22-F of connector 22 have odd reference numbers 51-T to 59-T, terminals 51-T to 59-T are connected to terminals 41-T to 49-T respectively.

The male part 22-M comprises odd numbered pins 51-P to 59-P which can be plugged to corresponding terminals 51-T to 59-T and the male part 22-M comprises even numbered pins 50-P to 58-P which can be plugged to corresponding terminals 50-T to 58-T.

The ground line 36 from power supply device 2 is connected to pins 40-P and 48-P of the first set and pins 41-P and 49-P of the second set. The V voltage line 34 is connected to pin 46-P through resistor 60 and line 35 and to pin 47-P through resistor 61 and line 37. The data lines 32 are connected to corresponding pins 42-P and 43-P. Pins 44-P and 45-P are connected at the output lines 64 and 65 of the hot plug circuits 62 and 63 respectively, according to the present invention. There is one hot plug circuit per slave card.

In a preferred embodiment of the present invention, pins 56-P, 58-P and 57-P, 59-P of connectors 20 and 22 are shorter than pins 50-P, 52-P and 54-P and pins 51-P, 53-P and 55-P respectively.

On each slave card such as 3-1 and 3-2, pins 58-P and 56-P, 51-P and 57-P are located at opposite ends of connector parts 20-M and 22-M respectively to prevent the plugging of the slave cards in a skewed manner from disturbing the right sequence of operations.

Pin 58-P is connected to pin 56-P and pin 59-P is connected to pin 57-P through wires 70 and 71 respectively.

The logic circuit 26 on card 3-2 comprises a decoupling capacitor Cd arranged between the ground line 74 and voltage line 76 connected to pin 50-P and 54-P respectively.

The logic circuit 24 on card 3-2 comprises the decoupling capacitor Cd arranged between the ground line 75 and voltage line 77 connected to pin 51-P and 55-P respectively.

When a card, for example 3-2 is plugged to the board, contacts are first established between lines 36 and 74, the logic circuit 26 is not able to operate since no voltage is provided on line 76 as will be explained hereafter in reference to FIG. 3.

The voltage V is established on line 76 by hot-plug circuit 62 when the connector part 20-M is fully plugged into part 20-F due to the different pin lengths and with a predefined limited current.

The hot plug circuits 62 and 63 are identical. They comprise a Field Effect Transistor FET, a power control circuit and a control logic device. The hot-plug circuit 62 is shown in details on FIG. 3 and will be described hereafter in reference to this Figure.

When the master card 1 is plugged to board 12, the voltage V is applied to node 80 through resistor 60, so that a first control voltage of high level is applied at the input of control logic 82.

Control logic comprises a switching device 83 which is closed when node 80 is at the high level voltage and provides the ground voltage at its output node 85 and is open when node 80 is at the ground voltage.

Thus, as far as the plugging of card 3-2 is not completed, the switch device is closed.

The power control circuit 84 comprises an operational amplifier 86 having its non-inverting input 88 connected to the output 85 of control logic 82 through protecting resistor 90 of resistance R1, on one hand and to line 34 through resistor 92 of resistance R2, on the other hand.

The common node 94 between resistors 90 and 92 connected to input line 88 of operational amplifier 86 is also connected to the first terminal of capacitor 96 of capacitance C having its second terminal connected to the ground line 36.

The inverting input of operational amplifier 86 is connected to line 64 at node 98.

The output 100 of operational amplifier 86 is connected to the gate of FET transistor 102 having its drain terminal connected to line 34 at node 104 and its source terminal connected to node 98.

In a preferred embodiment of the invention, the FET transistor 102 is a N-channel device which is biased through resistor 106 having a first terminal connected to node 100 and a second terminal connected to a biasing voltage Vg higher than +V.

The circuit shown in FIG. 3 operates as follows

When a card such as 3-2 is plugged to board 12, line 64 on card 1 is first connected to line 76 on card 3-2.

The node 85 is grounded because the connection between lines 35 and 70 is not made because of short pins 58-P and 56-P.

Resistance R1 of resistor 90 is low and node 94 is at the ground level, so that transistor 102 is OFF.

Once the connection between lines 35 and 70 is made, the ground voltage is applied at node 80 and the switching device 83 is open. Thus, the charge of capacitor 96 starts with a time constant R2.C and a ramp voltage Va is generated at node 94 such as:

$$dVa/dt = a$$

where a is a constant equal to R2.C.

Operational amplifier 86 and FET transistor 102 constitute a follower arrangement which generates at node 98 a ramp voltage Vb which follows voltage Va, such as:

$$dVb/dt = a = R2.C$$

As a result decoupling capacitor 72 is charged with a current $$i = Cd.(dVb/dt) = Cd.R2.C$$

This current can be easily limited to an acceptable value by choosing R2 and C without taking the plugging time into consideration.

Figure 4A:
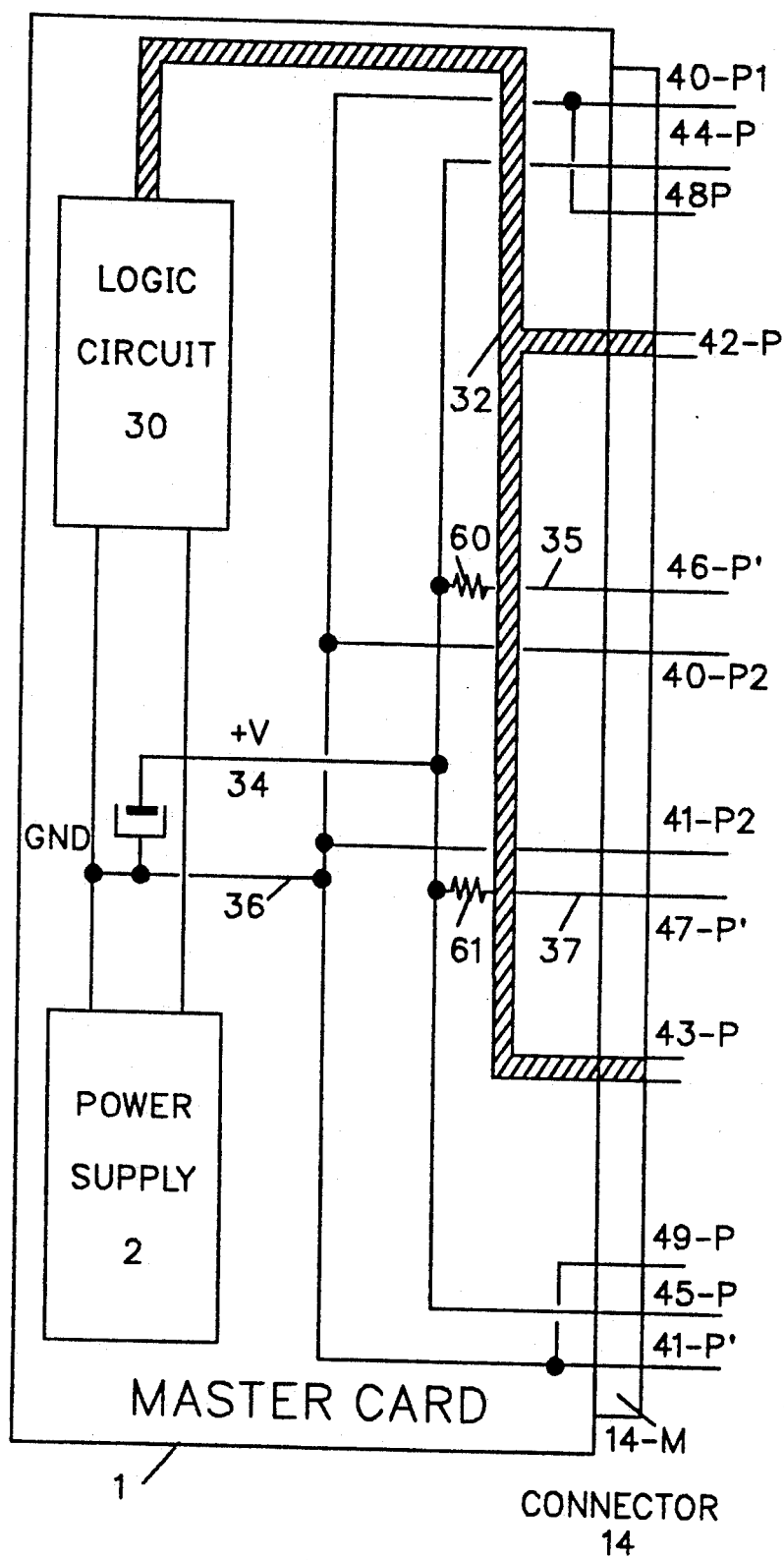
FIG. 4 is an alternate embodiment according to the teachings of the present invention.

FIG. 4 represents the hot plug circuits according to the present invention, implemented in the slave cards 3-1 and 3-2. The same reference numbers as in FIG. 2 are used to designate the similar components.

When a card such as 3-2 is plugged to the board, the ground voltage from line 36 is first applied to the logic circuit on card 3-2 through the long pins 40-P and 50-P of connector 20.

Figure 3:
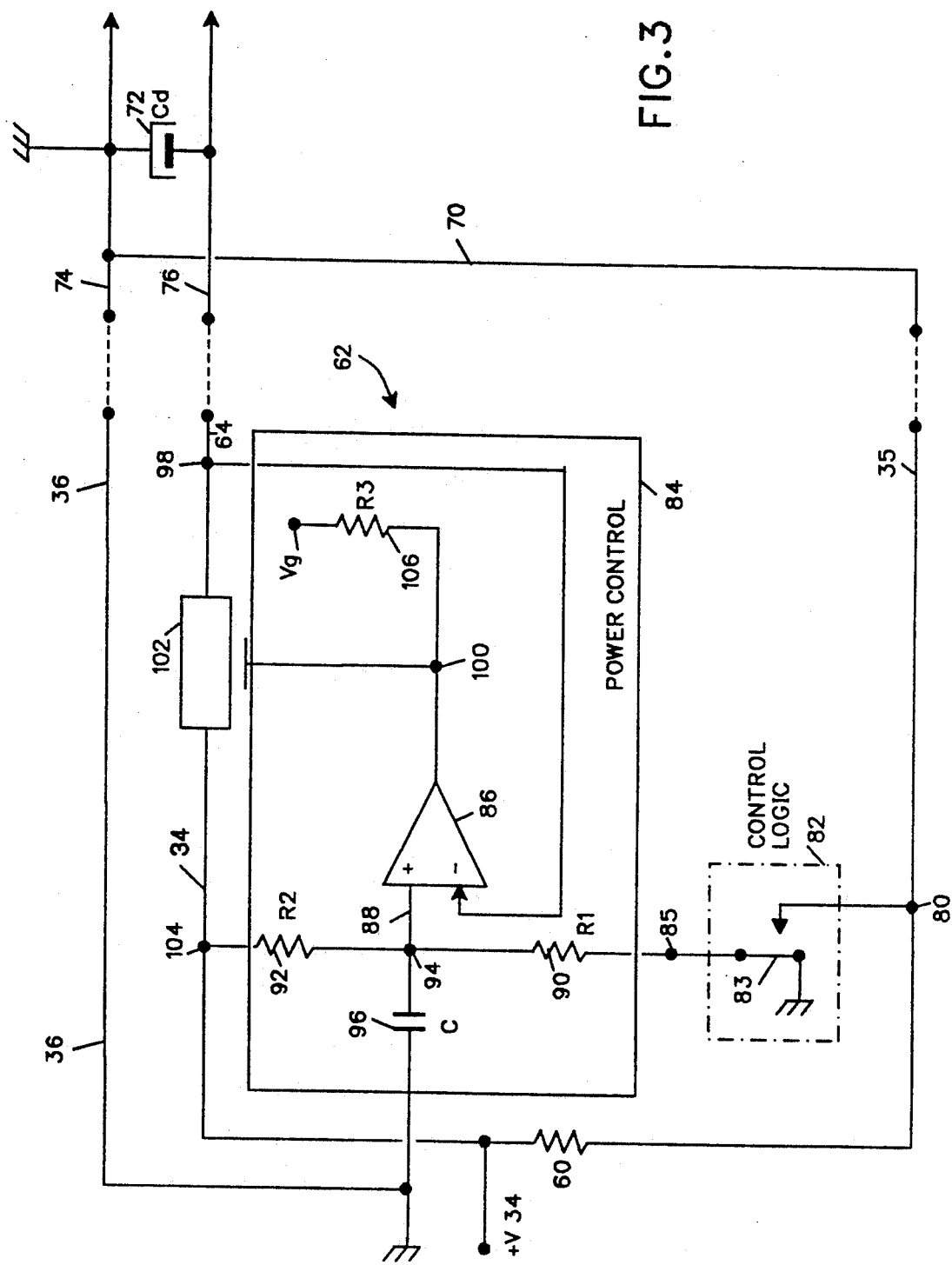
FIG. 3 shows details of the hot plug circuit according to the teachings of the present invention.

Also, the voltage V from line 34 is applied at node 80 through resistor 60, line 25 and pins 46-P' and 56-P' which are similar to pins 46-P and 56-P but are longer, in order node 80 be first at a high level to close switch 83 in control logic circuit 82 as shown in FIG. 3.

Then, when all pins of the connector 20 are fully plugged, node 80 is connected to the ground through short pins 48-P and 58-P and voltage V is provided at the drain of FET transistor 102 in hot plug circuit 62. This circuit operates as previously described in reference to FIG. 3.

In this implementation, the control logic circuit 82 is optional since the voltage on line 75 can be generated as soon as the card is plugged.

This can be done by connecting the capacitor 96 of the power control circuit to the short ground pin 58-P and suppressing line 70, resistor 60, line 35 and pins 46-P' and 56-P' and control logic.

We claim:

1. A hot plug circuit (62) for limiting the surge current generated at the interconnection of first circuit means (30) arranged on a first card (1) and powered by a supply device (2) providing a first supply voltage (ground) on a first supply line (36) and a second supply voltage (+V) on a second supply line (34), with second circuit means (26) on a second card powered by the supply device (2) through a third supply line (74) and fourth supply line (76), where said surge current results from the charge of a decoupling capacitor of capacitance Cd arranged on the second card between the third and fourth supply lines when the cards are interconnected through an interconnecting arrangement (14, 12, 22), characterized in that it comprises:

controlled ramp voltage generation means (82, 84 and 102) connected to the first and second supply lines and activated when the connection between the first and third supply lines is completed through the interconnecting arrangement to start the generation on said fourth supply line of a first ramp voltage Vb derived from the voltages on the first and second supply lines, said ramp voltage having an adjustable slope a=dVb/dt, whereby the surge current i which is equal to a.Cd can be limited to a desired value by adjusting the slope value a.

2. A hot plug circuit (62) for limiting the surge current generated at the interconnection of first circuit means (30) arranged on a first card (1) and powered by a supply device (2) providing a first supply voltage (ground) on a first supply line (36) and a second supply voltage (+V) on a second supply line (34), with second circuit means (26) on a second card powered by the supply device (2) through a third supply line (74) and fourth supply line (76), where said surge current results from the charge of a decoupling capacitor of capacitance Cd arranged on the second card between the third and fourth supply lines, said hot plug circuit characterized in that it comprises:

an interconnecting arrangement (14, 12, 22) for coupling the second circuit means to the first circuit means, said interconnecting arrangement comprises a first connector (14) having first and second supply pins (40-P, 48-P) connected to the first supply line, with said first pin being longer than said second pin, the first pin being connectable to the third supply line to first supply the first voltage to the second circuit means, and the second card comprises a presence indication line (70) connectable to the second supply pin when the interconnection of the first and second cards is completed, which generates on the said presence indication line (70) a first control signal derived from the first supply voltage which is provided to the controlled ramp generation control means to start the generation of the first ramp voltage; and controlled ramp generation means (82, 84, 102) connected to the first and second supply lines and activated when a connection between the first and third supply lines is completed through the connecting arrangement to start the generation on said fourth supply line of a first ramp voltage Vb derived from the voltages on the first and second supply lines, said ramp voltage having an adjustable slope a=dVb/dt, whereby the surge current i which is equal to a.Cd can be limited to a desired value by adjusting the slope value a.

3. A hot plug circuit according to claim 2 characterized in that:

the first and second supply pins of the first connector are located at a first end of said connector and the connector comprises a third supply pin located at its second end, and the interconnecting arrangement comprises a second connector (20) located on the second card, said second connector comprising fourth, fifth and sixth pins connectable to the first, second and third pins respectively when the first and second cards are interconnected through the interconnecting arrangement, the presence indication line being connected on the second card between the fifth and sixth pins, whereby the first control signal is provided from the presence indication line to the controlled ramp generation means when the third and sixth pins are connected which prevents the plugging of the cards in a skewed manner from disturbing the operation of the first and second circuit means.

4. A hot plug circuit according to claim 2 or 3 characterized in that it the controlled ramp generation means comprise:

a ramp generation control circuit (82) having a first and second status, said circuit being responsive to the first control signal when the first and second cards are completely interconnected being responsive to a second control signal derived from the second supply voltage when the first and second cards are not completely interconnected, whereby it is set to its first and second status which respectively starts the generation of the first ramp voltage or prevents said ramp voltage from being generated.

5. A hot plug circuit according to claim 4 characterized in that:

the controlled ramp generation means comprise a ramp generating circuit (84, 102) responsive to the first and second status of the ramp generation control circuit and connected to the second supply line to generate the first ramp voltage on the fourth supply line when the cards are completely interconnected through the interconnecting arrangement.

6. A hot plug circuit further according to claim 5 characterized in that the ramp generating circuit comprises:

a charge circuit comprising a resistor (92) of resistance R2 having a first and second terminals and a capacitor (96) of capacitance C having a first and second terminals, the first terminals of the resistor and of the capacitor being connected to the first and second supply lines respectively and the second terminals of the resistor and capacitor being connected to a common node, said common node being connected or not to the first supply voltage depending upon whether the ramp control circuit is in its second or first status respectively, whereby a second ramp voltage Va of slope a=R.C is generated at the common node when the ramp generating control circuit is in its first status, and voltage follower means (86,102) connected to the common node of said resistor and capacitor for generating at its output (98) the second ramp voltage.

7. A hot plug circuit according to claim 6 characterized in that the voltage follower means comprises:

an operational amplifier (86) having a first input connected to the common node and a second input connected to the fourth supply line; and a field effect transistor having a first electrode (drain) connected to the first terminal of the resistor and a second electrode (source) connected to the fourth-supply voltage line and a control electrode (gate) responsive to the output signal from the operational amplifier, whereby the first ramp voltage is generated at the second electrode of the field effect transistor when the cards are completely interconnected.

8. The hot plug circuit of claim 1 wherein the controlled ramp voltage generation means includes an FET device having a source electrode for coupling to the fourth supply line, a gate electrode and a drain electrode;

an operational amplifier having an output coupled to the gate electrode;

a charging circuit means coupled to a non-inverting terminal of said operational amplifier; said charging circuit means coupled between the first supply line and the second supply line;

a ramp generation control circuit coupled to the charging circuit; and means interconnecting the source electrode to an inverting input of the operation amplifier.

9. In a computer system or the like having a system bus including electrical power to which I/O cards or boards are inserted and de-inserted a circuit arrangement for controlling signal transient to allow hot plugging of the card or boards comprising:

a circuitry for providing desired functions arranged on at least one of the boards;

a first signal line coupled to the circuitry, a second signal line coupled to the circuitry; said first signal line and said second signal line providing electrical power to the circuitry;

a ramp generation control circuit (82) having a first and second states, said circuit being responsive to a first control signal when the card is completely interconnected to the bus or being responsive to a second control signal when the card is not completely interconnected to the bus, whereby the ramp generation control circuit is set to its first and second states which respectively starts the generation of the first ramp voltage or prevents said ramp voltage from being generated; and a controlled ramp generation means comprising a ramp generating circuit (84, 102) connected to the ramp generation control circuit and responsive to the first and second states of the ramp generation control circuit to generate the first ramp voltage on the second line when the card is completely interconnected to the bus.

* * * * *